J. E. RIGHTMIRE.
MANUALLY PROPELLED VEHICLE.
APPLICATION FILED SEPT. 27, 1916.
1,264,559.
Patented Apr. 30, 1918.
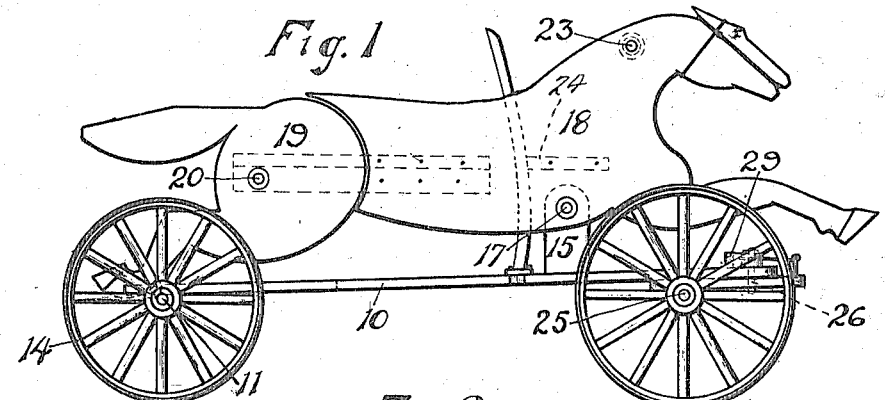
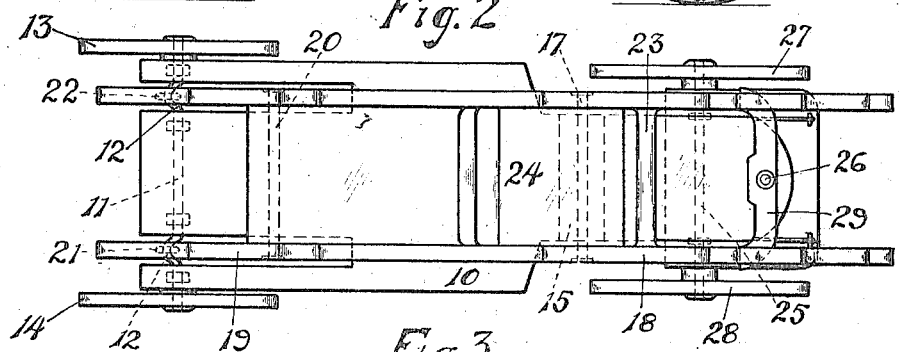
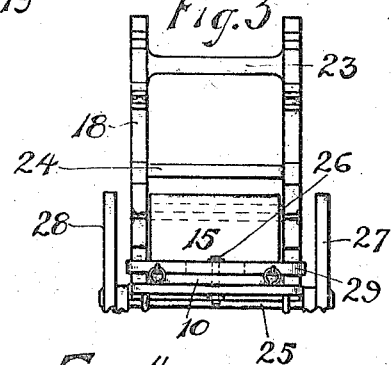
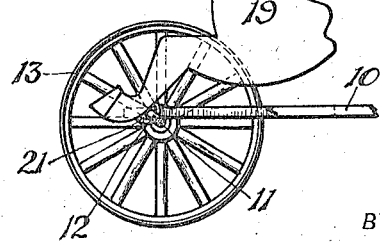
WITNESS
Leo C. Griffin.
INVENTOR,
JOHN E. RIGHTMIRE.
BY Frank H. Allen
Frederick K. Daygern
ATTORNEYS.

UNITED STATES PATENT OFFICE.

JOHN E. RIGHTMIRE, OF MELROSE, MASSACHUSETTS.

MANUALLY-PROPELLED VEHICLE.

1,264,559. Specification of Letters Patent. Patented Apr. 30, 1918.

Application filed September 27, 1916. Serial No. 122,530.

*To all whom it may concern:*

Be it known that I, JOHN E. RIGHTMIRE, a citizen of the United States, residing at Melrose, in the county of Middlesex and State of Massachusetts, have invented a certain new and useful Improvement in Manually-Propelled Vehicles, of which the following is a specification, reference being had to the accompanying drawings.

This invention relates to vehicles and, more particularly, to the class of vehicles provided for young children, although the same could be utilized in larger sizes for more practical purposes; the construction and propelling means being such that a growing child is compelled to exercise all parts of the body and limbs in order to operate the vehicle.

Briefly described, my said invention, as here illustrated, consists of a four-wheeled vehicle having mounted thereon means whereby the same may be steered by the feet and having propelling means operated by the hands, and in the form of a rocking horse, while the rider sits on a fixed seat.

My said invention is clearly shown as to its several parts, and as a whole, in the annexed drawings, Figures 1 and 2 being, respectively, side elevation and plan views of a vehicle embodying my present improvements. Fig. 3 is a front end elevation of the same, and Fig. 4 is a detached, detail, view of one of the rear wheels and the coöperating leg of the horse.

Referring to these drawings, the numeral 10 indicates the bed or body of the vehicle and 11 denotes the rear axle which is journaled to said body in such manner that it (the axle) may revolve freely, and said axle is cranked, as at 12. Fixedly secured to the projecting end portions of axle 11 are wheels 13—14 which serve as the driving wheels of the vehicle.

Secured to the body 10 and extending upward therefrom are opposing stands 15—16 that are connected by a cross-bar 17 on which is fulcrumed a lever 18 which latter is, by preference, designed to represent in side elevation, the body, head and fore-legs of a horse; the hind-legs 19 being pivoted to the said body at 20 and connected by links 21—22 with the cranks 12, the arrangement of the last described parts being such that, when the body 18 of the horse is rocked on its fulcrum 17, the rear axle and wheels of the vehicle will be rotated, thus causing the complete vehicle to travel along the ground or floor, as the case may be.

The opposing sides 18 of the body of the horse are connected by a bar 23 which is located within easy reach of a person seated on a seat 24 which is fixedly mounted upon the body 10 of the vehicle intermediate of said sides.

The front axle 25 is secured to the body 10 by means of a king-bolt 26, and wheels 27—28 are secured to the extended end portions of the said front axle. Secured to the upper end of the bolt 26 is a bar 29 whose ends are within easy reach of the feet of the operator of the vehicle.

It will now be understood that, when the rider of the vehicle is located on the fixed seat 24 supported from the bed 10, his feet may control the steering lever 29 while his hands may operate the propelling mechanism by pushing the bar 23 of the lever 18 forward and backward. When thus operated the vehicle may be caused to travel along the ground or floor at any desired speed within the limits of the described propelling mechanism.

It should be specially noted that the operator of the vehicle does not rock with the horse but is, rather, seated firmly and safely on the fixed seat, between the protecting side portions of the body of the horse, thus rendering it perfectly safe for young children to operate the vehicle.

Having thus described my invention, I claim as new and wish to secure by Letters Patent:—

A manually propelled vehicle, comprising a bed-member, rear and front axles equipped with carrying wheels, the rear axle being cranked and journaled upon said bed-member, a lever including opposite sides having secured therebetween a transverse bar arranged to be grasped by the hands of the operator, said lever-sides being fulcrumed upon said bed-member and having pivoted thereto leg-forming members linked to the cranks of said rear axle, the rear carrying wheels being fixed to their axle, whereby said pivoted rear leg-forming portions will, as the required pressure is exerted thereon, actuate said wheels, and foot steering means for the operator arranged in connection with the front-wheel axle.

JOHN E. RIGHTMIRE.